US008819024B1

(12) United States Patent
Toderici et al.

(10) Patent No.: US 8,819,024 B1
(45) Date of Patent: Aug. 26, 2014

(54) LEARNING CATEGORY CLASSIFIERS FOR A VIDEO CORPUS

(75) Inventors: George Toderici, Mountain View, CA (US); Hrishikesh Aradhye, Mountain View, CA (US); Alexandru Marius Pasca, Sunnyvale, CA (US); Luciano Sbaiz, Zurich (CH); Jay Yagnik, Mountain View, CA (US)

(73) Assignee: Google Inc., Mountain View, CA (US)

( * ) Notice: Subject to any disclaimer, the term of this patent is extended or adjusted under 35 U.S.C. 154(b) by 590 days.

(21) Appl. No.: 12/950,955

(22) Filed: Nov. 19, 2010

Related U.S. Application Data

(60) Provisional application No. 61/262,916, filed on Nov. 19, 2009.

(51) Int. Cl.
*G06F 7/00* (2006.01)
*G06F 17/30* (2006.01)

(52) U.S. Cl.
USPC .............................. 707/740; 707/754; 725/45

(58) Field of Classification Search
None
See application file for complete search history.

(56) References Cited

U.S. PATENT DOCUMENTS

| 5,754,681 | A | 5/1998 | Watanabe et al. |
| 5,930,392 | A | 7/1999 | Ho |
| 6,606,411 | B1 * | 8/2003 | Loui et al. ..................... 382/224 |
| 6,915,025 | B2 | 7/2005 | Wang et al. |
| 7,024,033 | B2 | 4/2006 | Li et al. |
| 7,107,520 | B2 | 9/2006 | Gargi |
| 7,519,217 | B2 | 4/2009 | Liu et al. |
| 7,609,893 | B2 | 10/2009 | Luo et al. |
| 8,015,132 | B2 | 9/2011 | Xu |
| 2004/0111432 | A1 * | 6/2004 | Adams, Jr. et al. ......... 707/104.1 |
| 2008/0013940 | A1 * | 1/2008 | Jung et al. ....................... 396/78 |
| 2008/0162561 | A1 * | 7/2008 | Naphade et al. ........... 707/104.1 |
| 2008/0306995 | A1 * | 12/2008 | Newell et al. .............. 707/104.1 |
| 2009/0208106 | A1 * | 8/2009 | Dunlop et al. ................ 382/173 |
| 2009/0234886 | A1 | 9/2009 | Raghavan |
| 2009/0292685 | A1 | 11/2009 | Liu et al. |
| 2009/0313217 | A1 * | 12/2009 | Signorini et al. ................. 707/3 |
| 2010/0220922 | A1 | 9/2010 | Okada |

OTHER PUBLICATIONS

Agarwal, N., et al., "Blocking Objectionable Web Content by Leveraging Multiple Information Sources," SIGKDD Explor. Newsl., 2006, vol. 8, No. 1, pp. 17-26.
Ayad, H.G., et al., Cumulative Voting Consensus Method for Partitions with Variable Numbers of Clusters, IEEE Transactions on Pattern Analysis and Machine Intelligence, Jan. 2008, vol. 30, No. 1, pp. 160-173.
Ayad, H.G., et al., "On Voting-Based Consensus of Cluster Ensembles," Pattern Recognition, May 2010, vol. 43, No. 5, pp. 1943-1953.

(Continued)

*Primary Examiner* — Dung K Chau
(74) *Attorney, Agent, or Firm* — Fenwick & West LLP

(57) ABSTRACT

A classifier training system learns classifiers for categories by combining data from a category-instance repository comprising relationships between categories and more specific instances of those categories with a set of video classifiers for different concepts. The category-instance repository is derived from the domain of textual documents, such as web pages, and the concept classifiers are derived from the domain of video. Taken together, the category-instance repository and the concept classifiers provide sufficient data for obtaining accurate classifiers for categories that encompass other lower-level concepts, where the categories and their classifiers may not be obtainable solely from the video domain.

19 Claims, 6 Drawing Sheets

(56) References Cited

OTHER PUBLICATIONS

Baluja, S., et al., "Video Suggestion and Discovery for YouTube: Taking Random Walks Through the View Graph," Proceedings of the International World Wide Web Conference, 2008, 10 pages.

Barnard, K., et al., "Matching Words and Pictures," Journal of Machine Learning Research, 2003, vol. 3, pp. 1107-1135.

Belkin, M., et al., "Manifold Regularization: A Geometric Framework for Learning from Labeled and Unlabeled Examples," Journal of Machine Learning Research, 2006, vol. 7, pp. 2399-2434.

Blei, D., et al., "Modeling Annotated Data," Proc. ACM SIGIR, 2003, pp. 127-134.

Blum, A., et al., "Combining Labeled and Unlabeled Data with Co-Training," COLT: Proceedings of the Workshop on Computational Learning Theory, Morgan Kaufmann Publishers, 1998.

Boureau, Y.L., et al., "Learning Mid-Level Features for Recognition," Conference on Computer Vision and Pattern Recognition, 2010, pp. 2559-2566.

Brubaker, S. C., et al., "On the Design of Cascades of Boosted Ensembles for Face Detection," International Journal of Computer Vision (IJCV), May 2008, vol. 77, No. 1-3, pp. 65-86.

Brubaker, S. C., et al., "Towards Optimal Training of Cascaded Detectors," Computer Vision—ECCV, Lecture Notes in Computer Science, 2006, vol. 3951/2006, pp. 325-337.

Brubaker, S. C., et al., "Towards the Optimal Training of Cascades of Boosted Ensembles," Toward Category-Level Object Recognition (CLOR), Lecture Notes in Computer Science, 2006, vol. 4170/2006, pp. 301-320.

Cao, X., et al., "Video Shot Motion Characterization Based on Hierarchical Overlapped Growing Neural Gas Networks," Multimedia Systems, Springer-Verlag 2003, School of Electrical and Electronic Engineering, Nanyang Technological University, Nanyang Avenue, Singapore, 639798, pp. 1-8.

Chang, C.-C., et al., "Liblinear: A Library for Large Linear Classification," 2010, [online] [Retrieved on Jan. 17, 2011], Software available at <http://www.csie.ntu.edu.tw/~cjlin/liblinear/>.

Chang, E., et al., "A Unified Learning Paradigm for Large-Scale Personalized Information Management," Proceedings of the Emerging Information Technology Conference, 2005.

Chou, Y.Y., et al., "A Hierarchical Multiple Classifier Learning Algorithm," Proceedings of the 15th International Conference on Pattern Recognition—ICPR 2000, vol. II, pp. 152-155.

Christoudias, C. M., et al., Co-Training with Noisy Perceptual Observations, CVPR, 2009, pp. 1-10.

Cilibrasi, R. L., et al., "A Fast Quartet Tree Heuristic for Hierarchical Clustering," Pattern Recognition, Mar. 2011, vol. 44, No. 3, pp. 662-677.

Concepción Morales, E.R., et al., "Building and Assessing a Constrained Clustering Hierarchical Algorithm," Proceedings of the 13th Iberoamerican Congress on Pattern Recognition, CIARP 2008, Sep. 9-12, 2008, pp. 211-218.

Cordella, L. P., et al., "Combining Single Class Features for Improving Performance of a Two Stage Classifier," Proceedings of the 2010 International Conference on Pattern Recognition, Aug. 23-26, 2010, pp. 4352-4355.

Cour, T., et al., "Learning from Ambiguously Labeled Images," Technical Report, U. Penn., 2009, pp. 1-8.

Day, M., et al., "Constructing Efficient Cascade Classifiers for Object Detection," Proceedings of 2010 IEEE 17th International Conference on Image Processing, Hong Kong, Sep. 26-29, 2010, pp. 3781-3784.

Dekel, O., et al., "Large Margin Hierarchical Classification," ICML, 2004, 8 pages.

Deng, J., et al., "ImageNet: A Large-Scale Hierarchical Image Database," CVPR09, 2009, 8 pages.

Duan, L., et al., "Domain Transfer SVM for Video Concept Detection," Proceedings of IEEE Conference on Computer Vision and Pattern Recognition (CVPR), 2009, pp. 1375-1381.

Duchenne, O., et al., "Automatic Annotation of Human Actions in Video," ICCV, 2009, 8 pages.

Dundar, M. M., et al., "Joint Optimization of Cascaded Classifiers for Computer Aided Detection," CVPR07, pp. 1-8.

Duygulu, P., et al., "Object Recognition as Machine Translation: Learning a Lexicon for a XED Image Vocabulary," Computer Vision—ECCV 2002, Proceedings of the 7th European Conference on Computer Vision, Copenhagen, Denmark, May 28-31, 2002, Part IV, pp. 97-112.

El-Sherif, E., et al., "Automatic Generation of Optimum Classification Cascades," International Conference on Pattern Recognition (ICPR), 2008, pp. 1-4.

El-Shishini, H., et al., "A Multistage Algorithm for Fast Classification of Patterns," Pattern Recognition Letters, Oct. 1989, vol. 10, No. 4, pp. 211-215.

Everingham, M., et al., "Hello! My Name is . . . Buffy—Automatic Naming of Characters in TV Video," BMVC, 2006, 10 pages.

Ewerth, R., et al., "Semi-Supervised Learning for Semantic Video Retrieval," Proceedings of the Conference on Image and Video Retrieval (CIVR), Amsterdam, The Netherlands, Jul. 9-11, 2007, pp. 154-161.

Fan, J., et al., "Incorporating Concept Ontology for Hierarchical Video Classification, Annotation, and Visualization," IEEE Transactions on Multimedia, Aug. 2007, vol. 9, No. 5, pp. 939-957.

Fan, R.-E., et al., "Liblinear: A library for large linear classification," Journal of Machine Learning Research, 2008, vol. 9, pp. 1871-1874.

Feng, H., et al., "A Bootstrapping Framework for Annotating and Retrieving WWW Images," Proc. ACM MM, 2004, 8 pages.

Feng, S. L., et al., "Multiple Bernoulli Relevance Models for Image and Video Annotation," Proc. CVPR, 2004, pp. 1-8.

Fergus, R., et al., "A Visual Category Filter for Google Images," ECCV, 2004.

Fergus, R., et al., "Learning Object Categories from Google's Image Search," Proceedings of the 10th IEEE International Conference on Computer Vision (ICCV), 2005, vol. 2, pp. 1816-1823.

Foo, B., et al., "A Distributed Approach for Optimizing Cascaded Classifier Topologies in Real-Time Stream Mining Systems," IEEE Transactions on Image Processing, Nov. 2010, vol. 19, No. 11, pp. 3035-3048.

Freund, Y., et al., "A Decision-Theoretic Generalization of On-Line Learning and an Application to Boosting," Journal of Computer and System Sciences, Aug. 1997, vol. 55, No. 1, pp. 119-139.

Freund, Y., et al., "A Decision-Theoretic Generalization of On-Line Learning and an Application to Boosting," Proceedings of European Conference on Computational Learning Theory (ECCV), Barcelona, Spain, Mar. 13-15, 1995, pp. 23-37.

Giusti, N., et al., "Theoretical and Experimental Analysis of a Two-Stage System for Classification," IEEE Transactions on Pattern Analysis and Machine Intelligence (PAMI), Jul. 2002, vol. 24, No. 7, pp. 893-904.

Gupta, S., et al., "Watch, Listen & Learn: Co-Training on Captioned Images and Videos," Proceedings of the European Conference on Machine Learning and Principles and Practice of Knowledge Discovery in Databases (ECML), 2008, 16 pages.

Hays, J., et al., "IM2GPS: Estimating Geographic Information from a Single Image," Proceedings of the IEEE Conference on Computer Vision and Pattern Recognition (CVPR), 2008.

Heiseleyz, B., et al., "Feature Reduction and Hierarchy of Classifiers for Fast Object Detection in Video Images," Proceedings of the 2001 IEEE Computer Society Conference on Computer Vision and Pattern Recognition (CVPR01), Kauai, Hawaii, Dec. 8-14, 2001, vol. II, pp. 18-24.

Hore, P., et al., "A Scalable Framework for Cluster Ensembles," Pattern Recognition, May 2009, vol. 42, No. 5, pp. 676-688.

Ikizler-Cinbis, N., et al., "Learning Actions from the Web," Proceedings of 12th International Conference on Computer Vision (ICCV), 2009, 8 pages.

Jones, M. J., et al., "Statistical Color Models with Application to Skin Detection," International Journal of Computer Vision (IJCV), Jan. 2002, vol. 46, No. 1, pp. 81-96.

Jordan, M.I., et al., "Hierarchical Mixture of Experts and the EM Algorithm," Neural Computation, 1994, vol. 6, pp. 181-214.

Kalogerakis, E., et al., "Image Sequence Geolocation with Human Travel Priors," Proceedings of the IEEE International Conference on Computer Vision (ICCV'09), 2009, 8 pages.

(56) References Cited

OTHER PUBLICATIONS

Kavukcuoglu, K., et al., "Learning Invariant Features Through Topographic Filter Maps," CVPRO9, pp. 1605-1612.
Kukenys, I., et al., "Classifier Cascades for Support Vector Machines," 2008 $23^{RD}$ International Conference Image and Vision Computing New Zealand (IVCNZ08), Nov. 26-28, 2008, pp. 1-6.
Kumar, S., et al., "Discriminative Fields for Modeling Spatial Dependencies in Natural Images," Advances in Neural Information Processing Systems (NIPS), 2004, 8 pages.
Lafferty, J., et al., "Conditional Random Fields: Probabilistic Models for Segmenting and Labeling Sequence Data," Proceedings of International Conference on Machine Learning (ICML), 2001, 8 pages.
Laptev, I., et al., "Learning Realistic Human Actions from Movies," Proceedings of the IEEE Conference on Computer Vision and Pattern Recognition (CVPR), 2008, 8 pages.
Leung, T., et al., "Representing and Recognizing the Visual Appearance of Materials Using Three-Dimensional Textons," International Journal of Computer Vision (IJCV), 2001, vol. 43, No. 1, pp. 29-44.
Li, L., et al., "Optimol: Automatic Online Picture Collection Via Incremental Model Learning," Proc. Computer Vision and Pattern Recognition (CVPR), 2007.
Li, Y., et al., "Bagging Based Efficient Kernel Fisher Discriminant Analysis for Face Recognition," The $18^{th}$ International Conference on Pattern Recognition (ICPR06), vol. 3, pp. 523-526.
Liu, J., "Recognizing Realistic Actions from Videos"in the Wild","Computer Vision and Pattern Recognition (CVPR), 2009, 1996-2003.
Liu, T.-Y., et al., "Support Vector Machines Classification with a Very Large-Scale Taxonomy," SIGKDD Explorations, 2005, vol. 1, pp. 36-43.
Lopez-Maury, L., "A Two-Component Signal Transduction System Involved in Nickel Sensing in the Cyanobacterium Synechocystis sp. PCC 6803," Molecular Microbiology, 2002, vol. 43, No. 1, pp. 247-256.
Lowe, D. G., "Distinctive Image Features from Scale-Invariant Keypoints," International Journal of Computer Vision (IJCV), 2004, vol. 60, No. 2, pp. 91-110.
Luo, H., "Optimization Design of Cascaded Classifiers," CVPRO5, vol. 1, pp. 480-485.
Ma, B. P., et al., "Discriminant Analysis for Perceptually Comparable Classes," FG08, pp. 1-6.
Mangai, U. G., et al., "A Hierarchical Multi-Classifier Framework for Landform Segmentation Using Multi-Spectral Satellite Images—A Case Study Over the Indian Subcontinent," 2010 Fourth Pacific-Rim Symposium on Image and Video Technology, (PSIVT10), Nov. 14-17, 2010, Singapore, pp. 306-313.
Mirzaei, A., et al., "Combining Hierarchical Clusterings Using Min-Transitive Closure," ICPR08, pp. 1-4.
Montagnuuolo, M., et al., "Parallel Neural Networks for Multimodal Video Genre Classification," Multimedia Tools and Applications, Jan. 2009, vol. 41, pp. 125-159.
Nam, M. Y., et al., "Cascade of Fusion for Adaptive Classifier Combination Using Context-Awareness," AMDO06, pp. 252-261.
Neapolitan, R. E., "Learning Bayesian Networks," Prentice Hall, Upper Saddle River, NJ, USA, 2003.
Neven, H., et al., "Image Recognition with an Adiabatic Quantum Computer I. Mapping to Quadratic Unconstrained Binary Optimization," 2008, pp. 107.
Nister, D., et al., "Scalable Recognition with a Vocabulary Tree," CVPR '06: Proceedings of the 2006 IEEE Computer Society Conference on Computer Vision and Pattern Recognition, IEEE Computer Society, Washington, DC, USA, Jun. 2006, vol. 2, pp. 2161-2168.
"OpenDirectoryProject," 1998-2010, [online] [Retrieved on Jan. 16, 2011] Retrieved from the internet <URL:http://www.dmoz.org/>.
Patterson, R. D., et al., "Complex Sounds and Auditory Images," Proc. Auditory Physiology and Perception, 1992, pp. 429-446.
Qi, G.-J., et al., "Correlative Multilabel Video Annotation with Temporal Kernels," ACM Transactions on Multimedia Computing, Communications, and Applications, 2008, vol. 5, No. 1, Article 3, pp. 1-27.
Quost, B., et al., "Pairwise Classifier Combination Using Belief Functions," Pattern Recognition Letters (PRL), Apr. 1, 2007, vol. 28, No. 5, pp. 644-653.
Raina, R., et al., "Self-Taught Learning: Transfer Learning from Unlabeled Data," Proceeding of International Conference on Machine Learning (ICML), Corvallis, OR, 2007, pp. 759-166.
Ramachandran, C., et al., "VideoMule: A Consensus Learning Approach to Multi-Label Classification from Noisy User-Generated Videos," ACM Multimedia, 2009, 4 pages.
Ranzato, M., et al., "Modeling Pixel Means and Covariances using Factorized Third-Order Boltzmann Machines," Proceedings of the IEEE Conference on Computer Vision and Pattern Recognition (CVPR10), 2010, pp. 2551-2558.
Ranzato, M., et al., "Unsupervised Learning of Invariant Feature Hierarchies with Applications to Object Recognition," CVPR07, pp. 1-8.
Rehn, M., et al., "Sound Ranking Using Auditory Sparse-Code Representations," Proc. ICML: Workshop on Sparse Methods for Music Audio, 2009, 3 pages.
Rodriguez, J. J., "Forests of Nested Dichotomies," Pattern Recognition Letters (PRL), Jan. 15, 2010, vol. 31, No. 2, pp. 125-132.
Sargin, E. M., et al., "Audiovisual Celebrity Recognition in Unconstrained Web Videos," Proc. ICASSP, 2009, 4 pages.
Schapire, R. E., "The Boosting Approach to Machine Learning: An Overview," MSRI Workshop on Nonlinear Estimation and Classification, 2002, pp. 1-23.
Schapire, R. E., et al., "Boosting the Margin: A New Explanation for the Effectiveness of Voting Methods," The Annals of Statistics, 1998, vol. 26, No. 5, pp. 1651-1686.
Schindler, G., et al., "Internet Video Category Recognition," First IEEE Workshop on Internet Vision, CVPR, 2008, 7 pages.
Serdyukov, P., et al., "Placing Flickr Photos on a Map," SIGIR'09: Proceedings of the $32^{nd}$ International ACM SIGIR Conference on Research and Development in Information Retrieval, 2009, New York, NY, USA, pp. 484-491.
Singh, R., et al., "Reduced-Complexity Delayed-Decision Algorithm for Context-Based Image Processing Systems," IEEE Transaction on Image Processing, Aug. 2007, vol. 16, No. 8, pp. 1937-1945.
Slonim, N., et al., "Discriminative Feature Selection via Multiclass Variable Memory Markov Model," Proceedings of the Nineteenth International Conference on Machine Learning, 2002, 8 pages.
Smeaton, A. F., et al., "Evaluation Campaigns and TRECVid," Proceedings of the $8^{th}$ ACM International Workshop on Multimedia Information Retrieval, ACM Press, Oct. 26-27, 2006, pp. 321-330.
Snoek, C., et al., "The MediaMill TRECVID 2008 Semantic Video Search Engine," 2009, 14 pages.
Snoek, C. G.M., et al., "Early Versus Late Fusion in Semantic Video Analysis," ACM Multimedia 2005, Nov. 6-11, 2005, Singapore, 4 pages.
Song, Y., et al., "Taxonomic Classification for Web-Based Videos," Conference on Computer Vision and Pattern Recognition (CVPR), 2010,.
Su, Y., et al., "Hierarchical Ensemble of Global and Local Classifiers for Face Recognition," IP, Aug. 2009, vol. 18, No. 8, pp. 1885-1896.
Sun, A., et al., Hierarchical Text Classification and Evaluation, Proceedings of the 2001 IEEE International Conference on Data Mining (ICDM), Nov. 2001, pp. 521-528.
Sun F., et al., "Two-Stage Computational Cost Reduction Algorithm Based on Mahalanobis Distance Approximations," ICPR00, vol. II, pp. 696-699.
Szczot, M., et al., "Package Boosting for Readaption of Cascaded Classifiers," 2010 International Conference on Pattern Recognition (ICPR10), pp. 552-555.
Tola, E., et al., "A Fast Local Descriptor for Dense Matching," Proceedings of IEEE Conference on Computer Vision and Pattern Recognition (CVPR), 2008, Alaska, USA, pp. 1-15.
Van Laere, O., et al., "Towards Automated Georeferencing of Flickr Photos," GIR'10: Proceedings of the $6^{th}$ Workshop on Geographic Information Retrieval, Feb. 18-19, 2010, pp. 1-7.

(56) References Cited

OTHER PUBLICATIONS

Viola, P., et al., "Rapid Object Detection Using a Boosted Cascade of Simple Features," Proceedings of IEEE Computer Society Conference on Computer Vision and Pattern Recognition (CVPR), 2001, vol. 1, pp. 511-518.

Visentini, I., et al., "Cascaded Online Boosting," Journal of Real-Time Image Processing, Dec. 2010, vol. 5, No. 4, pp. 245-257.

Visentini, I, et al., "On-Line Boosted Cascade for Object Detection," ICPR08, pp. 1-4.

Vuurpijl, L., et al., "An Overview and Comparison of Voting Methods for Pattern Recognition," Proceedings of the Eighth International Workshop on Frontiers in Handwriting Recognition (IWFHR02), 2002, pp. 195-200.

Vuurpijl, L., et al., "Architectures for Detecting and Solving Conflicts: Two-Stage Classification and Support Vector Classifiers," International Journal on Document Analysis and Recognition (IJDAR), Jul. 2003, vol. 5, No. 4, pp. 213-223.

Wang, P., et al., "Training a Multi-Exit Cascade with Linear Asymmetric Classification for Efficient Object Detection," Proceedings of 2010 IEEE 17$^{th}$ International Conference on Image Processing (ICIP10), Hong Kong, Sep. 26-29, 2010, pp. 61-64.

Wu, D., et al., "A Min-Max Framework of Cascaded Classifier with Multiple Instance Learning for Computer Aided Diagnosis," Proceedings of IEEE Computer Society Conference on Computer Vision and Pattern Recognition (CVPR09), 2009, pp. 1359-1366.

Wu D., et al., "Resilient Subclass Discriminant Analysis," ICCV09, pp. 389-396.

Wu, J. X., et al., "Fast Asymmetric Learning for Cascade Face Detection," IEEE Transactions on Pattern Analysis and Machine Intelligence (PAMI), Mar. 2008, vol. 30, No. 3, pp. 369-382.

Wu, X., et al., "Incorporating Prior Knowledge with Weighted Margin Support Vector Machines," Proceedings of the International Conference on Knowledge Discovery and Data Mining (SIGKDD), 2004, pp. 326-333.

Yagnik, J., et al., "Learning People Annotation from the Web Via Consistency Learning," Proc. Workshop on MIR, Augsburg, Bavaria, Germany, Sep. 28-29, 2007, pp. 285-290.

Yan, S.Y., et al., "Matrix-Structural Learning (MSL) of Cascaded Classifier from Enormous Training Set," Computer Vision and Pattern Recognition (CVPR07), 2007, pp. 1-7.

Yanai, K., et al., "Probabilistic Web Image Gathering," Proc. ACM SIGMM Workshop on MIR, 2005, pp. 57-64.

Yang, J., et al., "Cross-Domain Video Concept Detection Using Adaptive SVMS," Proceedings of the 15$^{th}$ International Conference on Multimedia, Sep. 2007, Augsburg, Bavaria, Germany, 10 pages.

Yang, L., et al., "Multi-Modality Web Video Categorization," Proc. MIR, 2007, ACM Press, pp. 265-274.

"YouTube—Broadcast Yourself," 2011, [online] [Retrieved on Jan. 16, 2011] Retrieved from the internet <URL:http://www.youtube.com>.

Zanetti, S., et al., "A Walk Through the Web's Video Clips," First IEEE Workshop on Internet Vision, Computer Vision and Pattern Recognition (CVPR08), 2008, 8 pages.

Zhang, B.C., et al., "Discriminant Analysis Based on Kernelized Decision Boundary for Face Recognition," AVBPA05, LNCS 3546, 2005, pp. 966.

Zhang, H., et al., "Automatic Partitioning of Full-Motion Video," Multimedia Systems, 1993, vol. 1, No. 1, pp. 10-28.

Zhang, X.Q., "Clustering by Evidence Accumulation on Affinity Propagation," ICPR08, 2008, pp. 1-4.

Zhao, M., et al., "Large Scale Learning and Recognition of Faces in Web Videos," Proceedings of the 8$^{th}$ IEEE International Conference on Automatic Face and Gesture Recognition, 2008, 7 pages.

Zhao, R., et al., "Narrowing the Semantic Gap—Improved Text-Based Web Document Retrieval Using Visual Features," IEEE Transactions on Multimedia, Jun. 2002, vol. 4, No. 2, pp. 189-200.

Zheng, Y.-T., et. al, "Tour the World: Building a Web-Scale Landmark Recognition Engine", Proceedings of the International Conference on Computer Vision and Pattern Recognition, Jun. 2009, Miami, Florida, U.S.A., pp. 1-8.

Zhu, X., et al., "Learning from Labeled and Unlabeled Data with Label Propagation," CMU CALD Tech Report CMU-CALD-02-107, 19 pages.

Zhu, X., "Semi-Supervised Learning Literature Survey," Computer Sciences Technical Report 1530, University of Wisconsin-Madison, 2005, pp. 1-38.

Cao, L., et al., "Annotating Photo Collections by Label Propagation According to Multiple Similarity Cues," Proceeding of the 16th ACM international conference on Multimedia, 2008, 9 pages.

Carvalho, R., "Metadata goes where Metadata is: contextual networks in the photographic domain," ESWC 2008 Ph. D. Symposium, 2008, 5 pages.

Chang, S., et al., "Recent Advances and Challenges of Semantic Image/Video," IEEE International Conference on Acoustics, Speech and Signal Processing, 2007, 4 pages.

Rodriguez, M., et al., "Automatic Metadata Generation Using Associative Networks," ACM Transactions on Information Systems, Feb. 2009, pp. 7:1-7:20, vol. 27, No. 2, Article 7.

Anderson, R., A local algorithm for finding dense subgraphs, in Proc. 19th Annual ACM-SIAM Symposium on Discrete Algorithms, 2008, pp. 1003-1009.

Davison, B. D., "Topical locality in the web," In Proc. 23rd Annual International ACM SIGIR Conference on Research and Development in Information Retrieval, 2004, pp. 272-279.

Dumais, S., et al., "Hierarchical classification of web content," In SIGIR '00: Proceedings of the 23$^{rd}$ annual international ACM SIGIR conference on Research and development in information retrieval, pp. 256-263, New York, NY, USA, 2000. ACM.

Goldman, S., et al., "Enhancing supervised learning with unlabeled data," In Proc. 17$^{th}$ International Conference on Machine Learning, 2000, pp. 327-334.

Guillaumin, M., et al., "Multimodal semi-supervised learning for image classification," in Proc. IEEE Conf. Computer Vision and Pattern Recognition, Jun. 2010, pp. 902-909.

Halevy, A., et al., "The unreasonable effectiveness of data," Intelligent Systems, IEEE, Mar. 2009, pp. 8-12, vol. 24, No. 2.

Huang, J., et al., "Exploring web scale language models for search query processing," In Proc. 19th international conference on World wide web, Apr. 26-30, 2010, pp. 451-460.

Koller, D., et al., "Hierarchically classifying documents using very few words," In the Proceedings of the Fourteenth International Conference on Machine Learning, ICML, Jul. 8-12, 1997, pp. 170-178.

Li, L.-J., et al., "Towards total scene understanding: Classification, annotation and segmentation in an automatic framework," In Proc. IEEE Conf. Computer Vision and Pattern Recognition, 2009, pp. 2036-2043.

Mahajan, D., et al., "Image classification using the web graph," In Proc. Multimedia, Oct. 25-29, 2010, pp. 991-994.

Niebles, J. C., et al., "Extracting moving people from internet videos," In ECCV '08: Proceedings of the 10th European Conference on Computer Vision, 2008, pp. 527-540, Part IV, LNCS 5305.

Tang, L., et al., "Large scale multi-label classification via metalabeler," in Proc. 18$^{th}$ International Conference on World Wide Web, Apr. 20-24, 2009, pp. 211-220.

Wang, Z., et al., "Youtubecat: Learning to categorize wild web videos," In Proc. IEEE Conf. Computer Vision and Pattern Recognition, Jun. 2010, pp. 879-886.

Zhu, X., Semi-supervised learning literature survey. In Tech Report. University of Wisconsin—Madison, Jul. 2008, pp. 1-60.

\* cited by examiner

LEARNING CATEGORY CLASSIFIERS FOR A VIDEO CORPUS

CROSS REFERENCE TO RELATED APPLICATIONS

The application claims the benefit of Provisional Application No. 61/262,916, filed on Nov. 19, 2009, which is hereby incorporated herein by reference.

BACKGROUND

1. Field of Art

The present invention generally relates to the field of digital video, and more specifically, to methods of automatically identifying categories representative of videos and training classifiers for the identified categories.

2. Background of the Invention

Categorizing a digital video associates the video with an indicator of a category that the video or a portion thereof represents, such as "cartoon" or "aircraft type." Automatic categorization of videos stored by video hosting services such as YOUTUBE is of great benefit to users of such systems, permitting the users to more effectively determine whether the video would be of interest to them by examining or otherwise using the video's associated category or categories.

Conventional video categorization systems typically use categories that are manually constructed. Such manually constructed categories do not adapt well to changing video corpuses, in which new concepts arise periodically and therefore require new labels for categorizing them. Furthermore, in order to determine which terms can serve as the more general categories that encompass the concepts of other more specific terms, the terms must be specifically structured in a taxonomy or other hierarchy, which is still more time-consuming to manually construct and thus less capable of adapting to new types of videos.

SUMMARY

In order to learn classifiers for categories, data from a category-instance repository comprising relationships between categories and more specific instances of those categories is combined with a set of video classifiers for different concepts. The category-instance repository is derived from the domain of textual documents, such as web pages, and the concept classifiers are derived from the domain of video. Taken together, the category-instance repository and the concept classifiers provide sufficient data for obtaining accurate classifiers for categories that encompass other lower-level concepts, where the categories and their classifiers may not be obtainable solely from the video domain.

In one embodiment, combining the category-instance repository with the concept classifiers comprises removing instances from the category-instance repository that do not correspond to one of the concepts of the concept classifiers, thereby restricting the analysis to category instances of categories that can be recognized in videos. Categories that likely would not be reliably recognized—e.g., categories that are too broad or too narrow, or that represent different concepts when applied to the video domain—are omitted. Category classifiers are then obtained based at least in part on the classifiers corresponding to the instances that are associated with the categories, such as by computing the arithmetic mean of the instance classifiers.

In one embodiment, the category-instance repository, or the concept classifiers, or both, are automatically obtained from the textual and video domains, respectively. The category-instance repository can be constructed by matching textual patterns indicating parent-child relationships, the former being categories and the latter being instances of those categories. Each category-instance relationship has a strength, which can be determined by, e.g., quantifying the co-occurrences of the categories and instances and/or the number of distinct patterns by which the category and instance were related. The concept classifiers can be obtained by extracting concept labels from video metadata and training classifiers for those concepts until a sufficient level of classifier accuracy is reached, with scores obtained from sufficiently accurate classifiers comprising additional information for training classifiers in the next iteration.

The category classifiers learned by the concept learning system have a number of uses within a video hosting service, such as supplementing any existing metadata about the video with labels of categories found to be embodied by the video based on the learned category classifier. Another use is to verify the accuracy of any existing metadata about the video, e.g., the textual metadata supplied by a user who submitted the video to the video hosting service.

Although the inventive principles are described with respect to discovering categories and training classifiers for use with digital videos, it is appreciated that the same principles could equally be applied to categorize and train classifiers for other types of digital media objects, such as image files, sound files, multimedia documents, textual documents, and other types of digital objects with which metadata is associated and from the content of which descriptive characteristics can be extracted.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

System Architecture

Figure 1:
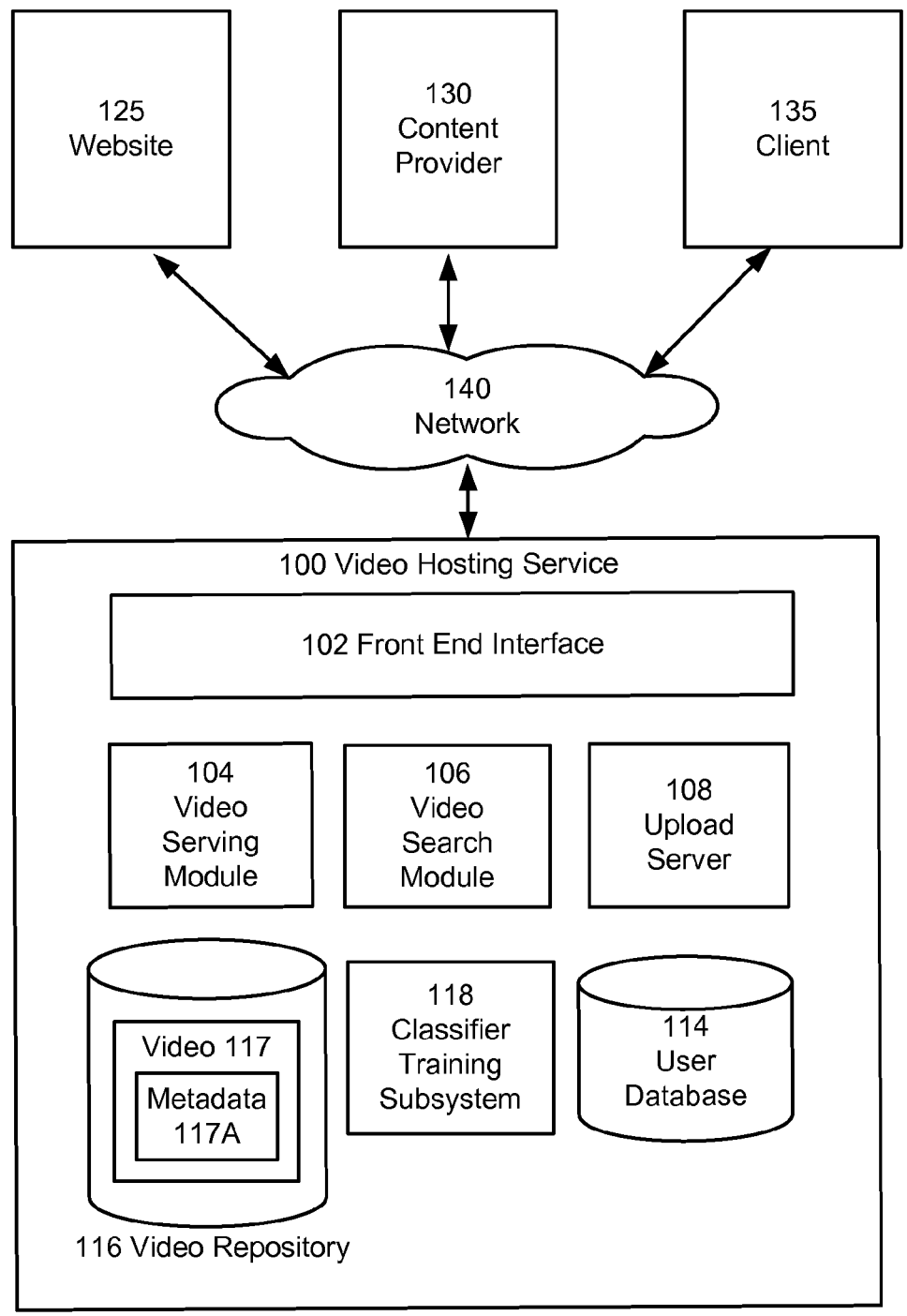
FIG. 1 is a block diagram of a video hosting service in which concept learning can be employed, according to one embodiment.

FIG. 1 is a block diagram of a video hosting service 100 in which classifier training can be employed, according to one embodiment. The video hosting service 100 represents a system such as that of YOUTUBE™ that stores and provides videos to users via client devices 135. The video hosting service 100 communicates with a plurality of content providers 130 and client devices 135 via a network 140 to facilitate sharing of video content between users. The video hosting service 100 can additionally obtain data from various external websites 125. The video data from the content providers 130, and (optionally) the web page or other data from the websites 125, serves as input data for category discovery performed by the video hosting service 100. Note that for the sake of clarity FIG. 1 depicts only one instance of website 125, content provider 130 and client device 135, though there could be any number of each.

Generally, a user of the content provider device 130 provides video content to the video hosting service 100 and a (usually different) user uses a client device 135 (also referred to simply as "client") to view that content. In practice, content provider devices 130 may also be used to view content. Additionally, a particular content provider device 130 may be operated by the same entity that operates the video hosting service 100.

The user of the content provider device 130 performs various content provider functions. Content provider functions may include, for example, uploading a video to the video hosting service 100, editing a video stored by the video hosting service 100, editing metadata information about a video, or editing content provider preferences associated with a video.

A client device 135 is a computing device that executes client software, e.g., a web browser or built-in client application, to connect to the video hosting service 100 via a network 140 and to display videos. The client device 135 might be, for example, a personal computer, a personal digital assistant, a cellular, mobile, or smart phone, a television "set-top box," or a laptop computer. In some embodiments, the client 135 includes an embedded video player such as, for example, the FLASH player from Adobe Systems, Inc. or any other player adapted for the video file formats used in the video hosting service 100.

Note that the terms "client" and "content provider" as used herein may refer to software providing client and content providing functionality, to hardware devices on which the software executes, or to the entities operating the software and/or hardware, as is apparent from the context in which the terms are used.

The website 125 comprises one or more web pages accessible to the video hosting service 100 via the network 140. The web pages comprise, for example, textual content such as HTML. The website may make available additional types of media content, such as general textual documents, presentations, audio files, image files, and the like.

The network 140 is typically the Internet, but may be any network, including but not limited to a LAN, a MAN, a WAN, a mobile wired or wireless network, a private network, or a virtual private network.

The video hosting service 100 operates on the video data from the content providers 130 and on the data from the website 125 when learning category classifiers. The video hosting service includes a front end interface 102, a video serving module 104, a video search module 106, an upload server 108, and a video repository 116. Other conventional features, such as firewalls, load balancers, authentication servers, application servers, failover servers, site management tools, and so forth are not shown so as to more clearly illustrate the features of the video hosting service 100. One example of a suitable service 100 is the YOUTUBE™ website. Other video hosting sites are known, as well, and can be adapted to operate according to the teachings disclosed herein.

In this description, the term "module" refers to computational logic for providing the specified functionality. A module can be implemented in hardware, firmware, and/or software. It will be understood that the named modules described herein represent one embodiment of the present invention, and other embodiments may include other modules. In addition, other embodiments may lack modules described herein and/or distribute the described functionality among the modules in a different manner. Additionally, the functionalities attributed to more than one module can be incorporated into a single module. Where the modules described herein are implemented as software, the module can be implemented as a standalone program, but can also be implemented through other means, for example as part of a larger program, as a plurality of separate programs, or as one or more statically or dynamically linked libraries. In any of these software implementations, the modules are stored on the computer readable persistent storage devices of the service 100, loaded into memory, and executed by the one or more processors of the service's computers. The foregoing further applies to components described herein as "servers."

The upload server 108 of the video hosting service 100 receives video content from a content provider 130. Received content is stored in the video repository 116. In response to requests from clients 135, a video serving module 104 provides video data from the video repository 116 to the clients. Clients 135 may also search for videos of interest stored in the video repository 116 using a video search module 106, such as by entering textual queries containing keywords of interest. The front end interface 102 provides the interface between client 135 and the various components of the video hosting service 100.

The video repository 116 contains a set of videos 117 submitted by content providers 130. The video repository 116 can contain any number of videos 117, such as tens of thousands or hundreds of millions. Each of the videos 117 has a unique video identifier that distinguishes it from each of the other videos, such as a textual name (e.g., the string "a91qrx8"), an integer, or any other way of uniquely naming a video. The videos 117 can be packaged in various containers such as AVI, MP4, or MOV, and can be encoded using video codecs such as MPEG-2, MPEG-4, H.264, and the like. In addition to their audiovisual content, the videos 117 further have associated metadata 117A, e.g., textual metadata such as a title, description, and/or tags provided by a content provider 130 who uploaded the video.

The video hosting service 100 further comprises a classifier training subsystem 118 that trains an accurate video classifier for a set of discovered categories. The trained classifier can then be applied to a given video to determine which of the categories the video represents. In one embodiment, the classifier training subsystem 118 is part of the video hosting service 100, as depicted in FIG. 1. In another embodiment, the classifier training subsystem 118 is separate from the video hosting service 100, receiving input from it and providing output to it. The classifier training subsystem 118 is described in greater detail in FIG. 2.

The service 100 may be implemented using a single computer, or a network of computers, including cloud-based computer implementations. The computers are preferably server class computers including one or more high-performance CPUs and 1G or more of main memory, as well as 500 Gb to 2Tb of computer readable, persistent storage, and running an operating system such as LINUX or variants thereof. The operations of the service 100 as described herein can be controlled through either hardware or through computer programs installed in computer storage and executed by the processors of such servers to perform the functions described herein. The service 100 includes other hardware elements necessary for the operations described here, including network interfaces and protocols, input devices for data entry, and output devices for display, printing, or other presentations of data.

Figure 2:
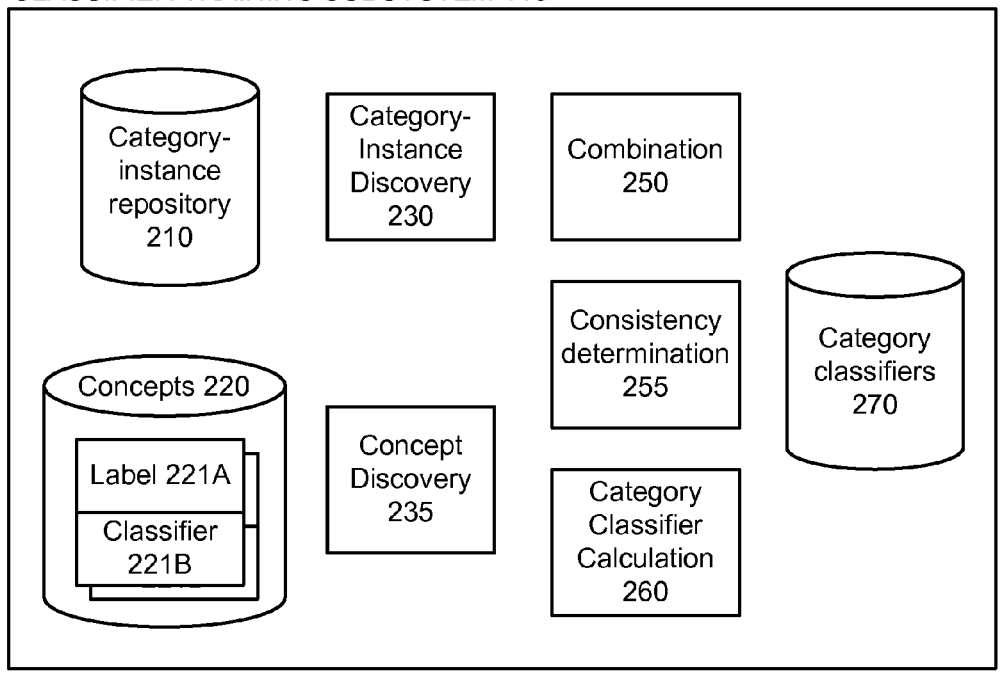
FIG. 2 illustrates the various components of the classifier training subsystem of FIG. 1, according to one embodiment.

FIG. 2 illustrates the various components of the classifier training subsystem 118, according to one embodiment. The classifier training subsystem 118 comprises repositories storing representations of categories and various instances of those categories, of concepts discovered from videos of the video repository 116, and (optionally) of modules for discovering the data stored in the repositories. The classifier training subsystem 118 further comprises various modules to process and combine the data from the repositories and to calculate category classifiers from the combined data. In one embodiment, the classifier training subsystem 118 is incorporated into an existing video hosting service 100, such as YOUTUBE. The various components of the classifier training subsystem 118 are now described in more detail.

The classifier training subsystem 118 comprises a category-instance repository 210 that stores a set of categories in association with a set of instances of those categories. Both categories and their associated instances can be represented as textual labels. For example, the category-instance repository 210 might include a category represented by the label "European banks" and associated instances represented by labels "BNP Paribas", "Lloyds", "Deutsche Bank", and other examples of European Banks, and a category "Sports" and associated instances "Tennis", "Baseball", "Football", and the like. In one embodiment, the various categories and instances are represented as textual strings.

In one embodiment, the category-instance repository 210 is provided to the classifier training subsystem 118 by some external source, such as another system on which the category-instance repository was created. In another embodiment, the classifier training subsystem 118 comprises a category-instance discovery module 230 that dynamically discovers the various categories and their instances, associates them, and stores them in the category-instance repository 210. In this embodiment, the category-instance discovery module 230 accesses a large number of documents comprising textual portions, such as web pages obtained from the external websites 125 of FIG. 1, and applies a set of known patterns to identify categories and their instances. For example, the category-instance discovery module 230 might find all instances of strings C and I matching the pattern C [such as|including|e.g.|like] I [and|,|.]
where the phrases "such as", "including", "e.g.", and "like" between C and I indicate that I is likely a more particular example of a general category C. Thus, for example, if a document analyzed by the category-instance discovery module 230 contained the text "Investors will also keep an eye on results from European banks such as BNP Paribas", the category-instance discovery module 230 would recognize the pattern "European banks such as BNP Paribas", where "European banks" is the category C, and "BNP Paribas" is its instance I. Similarly, if that same document, or a different document, contained the text "Regulators are turning their attention to European banks like BNP Paribas", the category-instance discovery module 230 would again identify an association between category "European banks" and instance "BNP Paribas", but through the pattern "C like I", rather than the distinct pattern "C such as I".

In one embodiment, the category-instance discovery module 230 calculates some relationship strength for each category-instance pair (e.g., "European banks" and "BNP Paribas") that quantifies the relevance of the category to the instance. For example, in one embodiment the relationship strength of a category C and an instance I is calculated as a score ($P^2+N$), where P is the number of distinct patterns for which there was at least one co-occurrence of C and I, and N is the total number occurrences of co-occurrences of C and I over the set of analyzed documents, independent of the particular pattern in which they co-occurred. In one embodiment, the category-instance discovery module 230 stores in the category-instance repository 210 only those pairs <C, I> having a relationship strength of at least some threshold value, thereby excluding pairings of categories and instances with only a tenuous relationship (e.g., those co-occurring only a few times).

The classifier training subsystem 118 further comprises a concepts repository 220 that stores various concepts 221 for which concept classifiers may be learned. Generally, a concept is a term or phrase that describes some entity, activity, event, place, object, or characteristic that is associated with a video 117. A concept can be associated with a video by having some representation within the video itself, e.g., appearing in the video, or by being present in metadata 117A for the video (e.g., in a user provided description, comments, annotations, or the like). A video can have many different concepts associated with it, but users typically are interested in what may be considered the most salient concept for the video. Each concept is associated with both a label 221A and a learned video concept classifier 221B. The label 221A is a unique name for the concept, and in one embodiment is implemented as text string of N words for some integer N, also referred to as an "n-gram." Some examples of such labels 221A are the strings (or n-grams) "cartoon," "hindi," "telenovela," "naruto shippuden," "english subtitles," "final fantasy," and "music video."

The video concept classifier 221B for a concept is a function that outputs a score representing a degree to which the features associated with the video indicate that the concept is relevant to the video. In one embodiment, the features to which the classifier 221B is applied include both video content features and scores obtained from classifiers. The classifier 221B can return different types of scores in different embodiments. For example, in one embodiment the classifier 221B outputs a real number indicating a strength of the relevance match between the video and the concept. In another embodiment, the classifier 221B outputs a Boolean value, e.g., the integer 1 to indicate that the video is relevant to the concept, and a different value, e.g., the integer 0, to indicate that the concept is not relevant.

In one embodiment, the concept repository 220 is derived partially or entirely on some system separate from the classifier training subsystem 118. In another embodiment, the classifier training subsystem 118 comprises a concept discovery module 235 that populates the concepts repository based on the videos of the video repository 116. Details of the working of the optional concept discovery module 235 according to one embodiment are set forth below under the heading "Sample Implementation of Concept Discovery Module".

The various categories of the category-instance repository 210 may permit learning classifiers of broad applicability. However, there are a number of challenges to generating classifiers for these categories. First, in order to train the classifiers, a training set of videos that have been labeled is required. However, the videos are initially unlabeled, and have only their video content and metadata. Second, certain categories may be too broad, or too narrow, to represent a useful and coherent set of videos. Third, other categories may be inconsistent when applied to the video domain, in that they have one meaning in the textual document domain from which they were derived, but a variety of different meanings in the video domain to which they are to be applied. For example, a city name culled from the domain of textual documents might be expected when used as the name of a video to represent different outdoor locations representative of the city, such as the Eiffel Tower or the Arc de Triomphe for the city Paris. In practice, however, the label "Paris" in video titles might represent a variety of different indoor venues not representative of any distinctive features of Paris, such as nightclubs, bars, and the like.

The classifier training subsystem 118 addresses these difficulties, identifying recognizable categories and training classifiers for the categories by combining the category-instance data of the repository 210 with the set of concepts and their associated classifiers from the concepts repository 220. The classifier training subsystem 118 further comprises a number of modules to process and combine the data in the category-instance repository 210 and the concepts repository 220 and to generate classifiers for the recognizable categories of the category-instance repository 210.

In addition to the category-instance repository 210 and the concepts repository 220, the classifier training subsystem 118 comprises a combination module 250 that combines the data from the category-instance repository 210 and the concepts repository 220, filtering the discovered categories to remove those categories not likely to be accurately recognized in the videos 117. More specifically, the combination module 250 intersects the instances of the category-instance repository 210 with the concepts of the concepts repository 220, removing those that are not present in both. For example, if there is an instance with the label "thoughtfulness" in the category-instance repository 210, but there is no concept with the same label 221A (i.e., "thoughtfulness") in the concepts repository 220 of concepts that can be recognized in videos, then the instance is removed. This has the effect of removing instances that in practice can't be recognized in the videos 117 of the video domain. ("Removal" of categories may—but need not—be accomplished by permanently removing the categories from the category-instance repository 210; alternatively, it may be accomplished by merely tagging the category with a flag, adding the category ID to an exclusion list, clearing a bit field in a category bit map, or some equivalent means.) The combination module 250 additionally associates, with the instances, the classifiers of the concepts with the same names.

Then, the combination module 250 computes, for each remaining instance, the instance's top N categories for some number N. The top categories for a given instance may be computed in different manners in different embodiments. In one embodiment, the top categories C for an instance I are computed based on the relationship strengths computed as described above, with the pairs <C, I> for the various categories C being sorted according to their associated relationship strengths, and up to N categories C being selected as the top categories. With the top N categories computed for each instance, the combination module 250 computes, for each category, the number of "hits", i.e., of instances having the category as one of the instance's top N categories. The combination module 250 then discards any category that has fewer than some predetermined minimum number of hits, or more than some predetermined maximum number of hits. This step discards categories that are too narrow (too few hits), or too generic (too many hits), to be reliable descriptors of a single meaningful concept. In one embodiment, the minimum and maximum thresholds are set by the system designer based on experience with the particular corpus. Thus, the combination module 250 produces a filtered set of categories and instances from the category-instance repository 210, each category associated with a set of instances that are sufficiently related to the category, and with the classifiers of the concepts corresponding to the instances.

The filtered set of categories produced by the combination module 250 may nonetheless include inconsistent categories. That is, as previously noted some categories may have a different meaning when naming videos in the video domain than they do in the textual domain (e.g., a city name such as "Paris" as name or name portion for videos of different indoor scenes not truly representative of Paris). To address this problem, the classifier training subsystem 118 further comprises a consistency determination module 255. The consistency determination module 255 computes a consistency score for each of the categories, the score measuring the consistency (or, viewed another way, the variability) of the videos associated with that category.

Specifically, the consistency determination module 255 analyzes some validation set of the videos 117. In one embodiment, 30% of the videos 117 are used for the validation set. For each video in the validation set, each of the concept classifiers 221B that was not filtered by the combination module 250 is applied to the video, thereby producing a set of scores, one per classifier. Each classifier producing a score that indicates a least some threshold level of accuracy is considered a "hit" for the category or categories with which the instance is associated. (Since the concepts 220 and instances correspond, the classifier 221B for a concept 220 is equivalently considered the classifier for the instance corresponding to the concept.) For each category with at least one hit, the consistency determination module 255 applies all the classifiers for the instances/concepts associated with the category to the video, determining a consistency score for that video based on the classifier scores produced by the classifiers. The closer the similarity scores produced by the classifiers for the different instances associated with the category, the greater the consistency score for that category. In one embodiment, the consistency score is the median absolute deviation (MAD) score, the computation of which is known to those having skill in the art. An aggregate consistency score for a category is then computed by averaging the consistency scores for that category across the various videos. The consistency determination module 255 then removes any categories that lack some predetermined threshold level of consistency, as quantified by its aggregate consistency score. Thus, the consistency determination module 255 produces, as output, a set of categories that produce sufficiently consistent results across all the instances associated with those categories.

The classifier training subsystem 118 further comprises a category classifier calculation module 260 that calculates category classifiers for the consistent categories identified by the consistency determination module 255, and a category classifiers repository 270 that stores the resulting classifiers along with labels corresponding to the associated categories. In one embodiment, the category classifiers are calculated as a function of the classifiers 221B of the individual instances (equivalently, concepts 220) associated with the categories. For example, in one embodiment the classifier for a category is the arithmetic mean of the classifiers of the associated instances. In another embodiment, the classifier for a category is the maximum score of all the scores for the associated instances.

Data Flow of Category Classifier Learning

Figure 3:
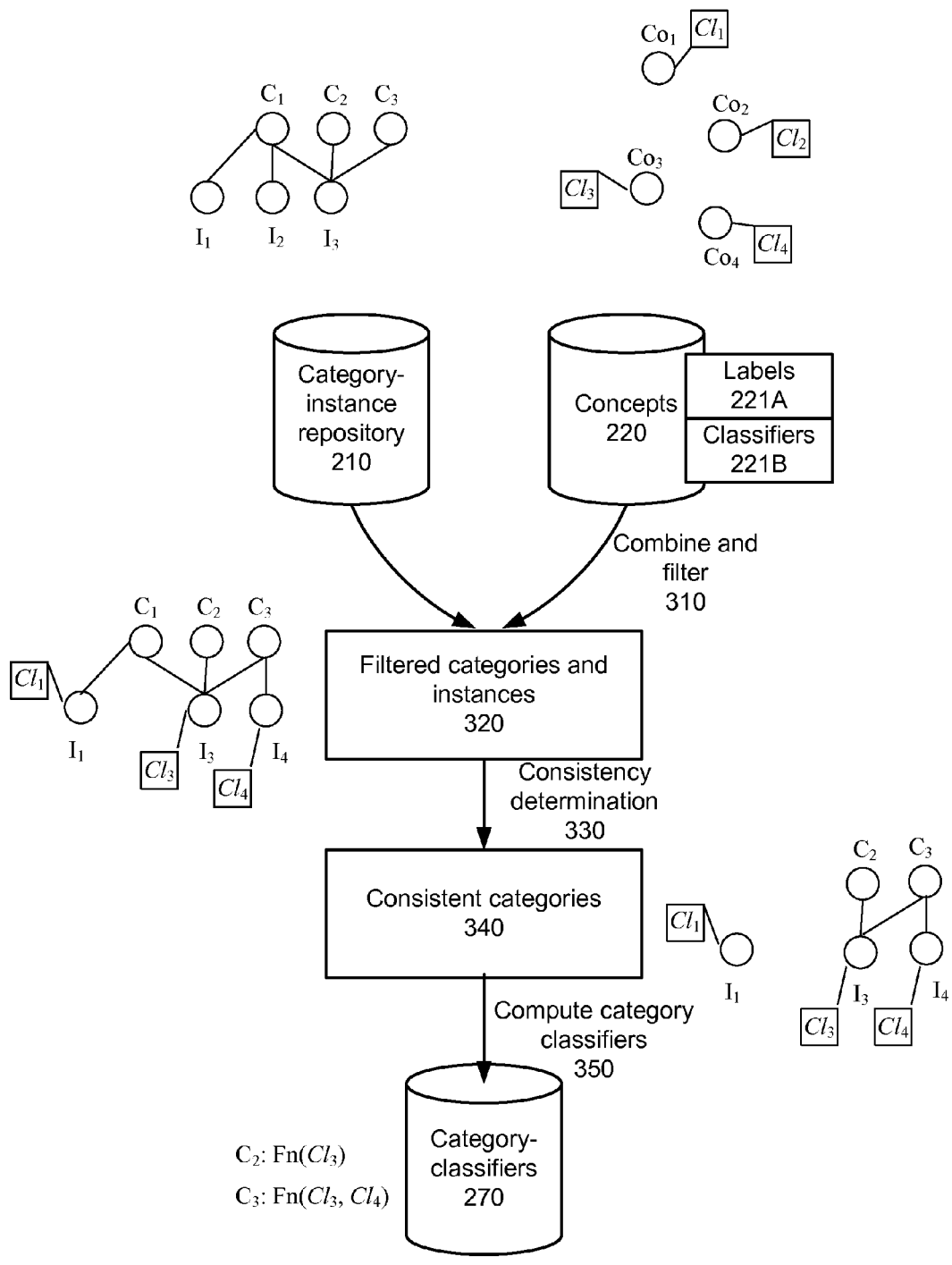
FIG. 3 is a data flow diagram illustrating the processing of data that takes place when calculating the category classifiers of FIG. 2, according to one embodiment.

FIG. 3 is a data flow diagram illustrating the processing of data that takes place when calculating the category classifiers 270 of FIG. 2, according to one embodiment. As described above, the category-instance repository 210 stores a set of categories and associated instances of those categories, and the concepts repository 220 stores a set of concepts, each with a label 221A that names the concept and an associated classifier 221B used to determine whether a video or other multimedia item represents that concept. As a simplistic conceptual example, the category-instance repository 210 is illustrated as having categories $C_1$ to $C_3$ and instances $I_1$ to $I_4$, with links between a category and an instance indicating that the instance is associated with the category and represents a more concrete example of it. For example, instances $I_1$, $I_2$, and $I_3$ (e.g., instances "BNP Paribas", "Lloyds", and "Deutsche Bank" from the earlier example) are all associated with category $C_1$ (e.g., "European banks") Similarly, concepts repository 220 is illustrated as having concepts $Co_1$ to $Co_4$, the concepts being associated with classifiers $Cl_1$ to $Cl_4$, respectively.

The combination module 250 combines 310 the data from the category-instance repository 210 with that from the concepts repository 220, as described above. The combination module 250 filters out 310 any instances not corresponding to one of the concepts 220, and any categories for which there are too few or too many associated instances. The result is a filtered set 320 of categories and instances, each category being associated with a set of instances (and the classifiers of the concepts corresponding to the instances). For example, in FIG. 3 the sample set of categories $C_1$ to $C_3$ and instances $I_1$ to $I_4$ has been pruned to remove instance $I_2$, indicating that $I_2$ does not correspond to any of concepts $Co_1$ to $Co_4$ (or any of the other concepts 220). Additionally, assuming that instance $I_1$ is equivalent to concept $Co_1$ and that instance $I_3$ is equivalent to concept $Co_3$, classifier $Cl_1$ is associated with instance $I_1$ and classifier $Cl_3$ is associated with instance $I_3$—that is, instances are associated with the classifiers of the concepts to which the instances correspond.

The consistency determination module 255 then performs consistency determination 330, removing any inconsistent categories from the set of categories produced by the combination module 250, thereby producing a set of consistent categories 340, along with their associated instances and classifiers. For example, in the sample category-instance diagram illustrating the consistent categories 340, the inconsistent category $C_1$ has been removed, illustrating that $C_1$'s instances $I_1$ and $I_3$ perhaps represented different things in the video domain.

The category classifier calculation module 260 then computes 350 the classifiers 270 for the remaining consistent categories. For example, in one embodiment the classifier for a category is a function (e.g., the arithmetic mean) of the classifiers of its associated instances. Thus, the example of FIG. 3 depicts the classifier for category $C_2$ being a function of classifier $Cl_3$, and the classifier for category $C_3$ being a function of classifiers $Cl_3$ and $Cl_4$.

Applications of Category Classifier Learning

The above-described process, and the category classifiers obtained therefrom, have a number of valuable applications.

Figure 4:
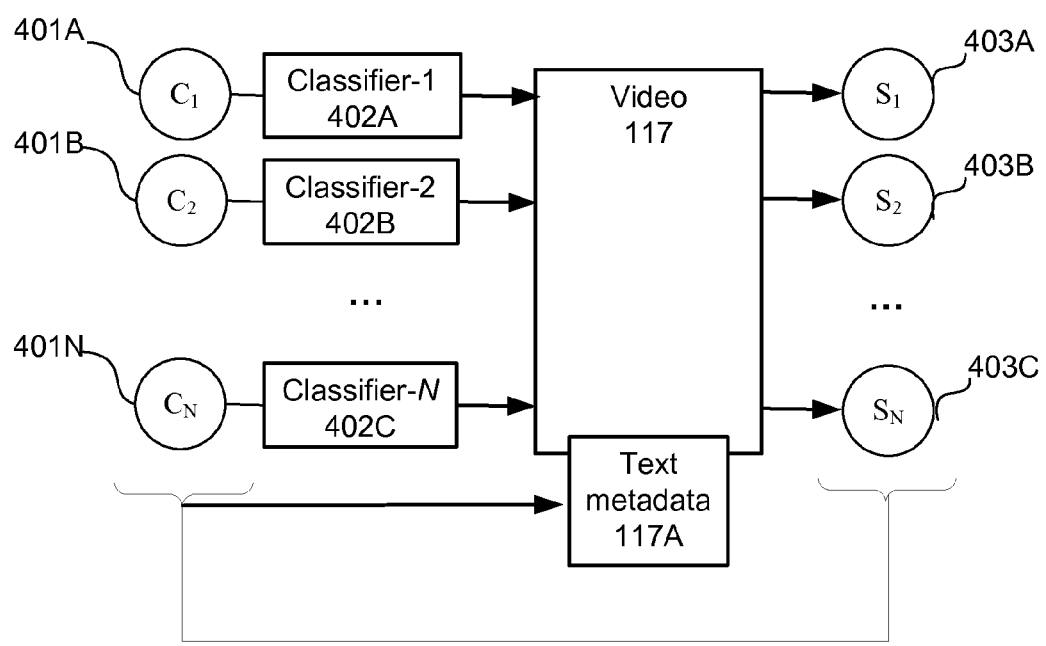
FIG. 4 is a data flow diagram depicting the use of the learned classifiers to augment metadata of a video, according to one embodiment.

1) Category Labeling of Videos: As one example, the process can be used to add category labels to videos having little or no user-supplied descriptive text. That is, the set of learned category classifiers 270 can be applied to each video 117 of the video repository 116. Then, in one embodiment, for each category classifier 270 whose resulting score indicates that the video 117 represents the associated category, the corresponding category label is added to the metadata of the video. For example, FIG. 4 depicts classifiers 402, each corresponding to a category 401. The classifiers 402 are applied to one of the videos 117, each producing some score 403. For the scores 403 that indicate that the video 117 represents the associated category 401, the labels 221A of the corresponding categories 401 are then added to the text metadata 117A of the video. In an alternative embodiment, the scores 403 are sorted, and only the labels 221A corresponding to the top N categories 220 are added. In another alternative embodiment, only those scores 403 indicating a particularly strong match—i.e., only those scores above some particularly high threshold—are added.

2) Category Representation for Video Browsing and Searching: Since, as previously noted, users frequently provide only very minimal textual descriptions when uploading a video to a video hosting site, this additional information can prove extremely useful to users when searching for videos of relevance to them. For example, the user can perform an explicit query for videos, such as searching for videos in a particular category, and the additional category information derived for the various videos using the category classifiers 270 can help to identify videos representative of the category. Similarly, a video hosting service using the category data produced by the classifier training subsystem 118 could display some form of visual representation of the learned categories, such as a hyperlink, a graphic, or a labeled option button, in a category-browsing user interface, e.g., on a web page associated with the video hosting site. A user could then click on a visual representation of the category to see videos previously determined to represent that category. To provide rapid user feedback, a video hosting service could periodically identify and cache the videos with the N highest scores for a given category and then quickly display those videos in response to a user clicking on the visual indication corresponding to that category. Or, the video hosting site could display the discovered categories found to be associated with a given video and added to the video metadata in its standard user interface, and a user could scan the metadata associated with a currently-displayed video to determine whether it is worth viewing further. Another way the content-based categories could be used is to allow the user to restrict a query to only those videos which contain the desired visual category—an example would be a user searching for "cars" but only desiring to see cartoon cars.

3) Correction of Video Descriptions Based on Category Identification: As another example application of the process, existing user-supplied textual metadata can be tested and—if found to be inaccurate—modified. This is of particular use for identifying and fixing "spam" video descriptions, where the user submitting the video intentionally provided a misleading description. More specifically, the user-supplied textual metadata for a video 117 is obtained. If the textual metadata includes a category label for which a category classifier 270 has been learned, the classifier is applied to the video, thereby producing a score. If the score indicates that the video does not represent the associated category—e.g., the score is below some minimum threshold—then a remedial action can be taken, such as flagging the video, removing the associated text from the user-supplied metadata, and the like.

Sample Implementation of Concept Discovery Module

Figure 5:
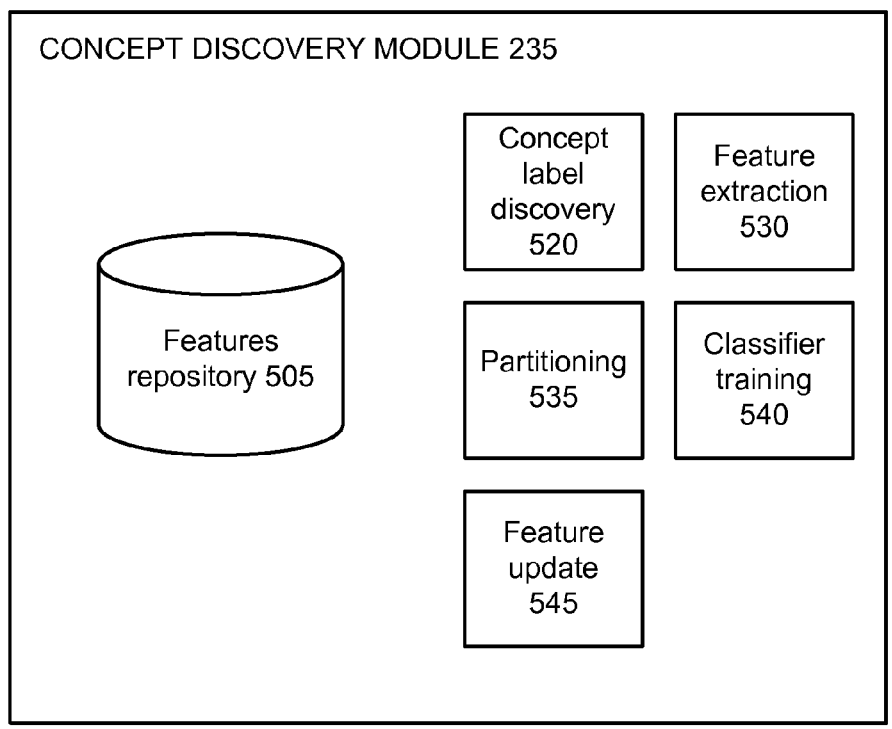
FIG. 5 illustrates the various components of the optional concept discovery module of the classifier training subsystem, according to one embodiment.

FIG. 5 illustrates the various components of the optional concept discovery module 235, according to one embodiment. The concept discovery module 235 discovers the concepts 220 that can be accurately recognized within videos 117 of the video repository 116 and trains the classifiers 221B for those concepts.

The concept discovery module 235 has access to the video repository 116 of the video hosting service 100. The concept discovery module 235 additionally comprises a features repository 205 that stores, for videos of the video repository 116, associated sets of features that characterize the videos with respect to one or more types of information, such as color information. The features of a video 117 are distinct from the raw content of the video itself and are derived from it by a feature extraction module 530 and updated by a feature update module 245, described below. In one embodiment, the features are stored as a vector of values, the vector having the same dimensions for each of the videos 117 for purposes of consistency.

The concept discovery module 235 further has access to the concepts repository 220 of the classifier training subsystem 118, and creates the data thereof based on the operations of the below-described modules 520-545.

The concept discovery module 235 also comprises a concept label discovery module 520 that identifies potential concepts that can be used to label videos. In one embodiment, the concept label discovery module 520 extracts the concepts from the video metadata 117A of the various videos 117 in the video repository 116, or from some subset of the metadata, such as the title and tags but not the (typically lengthier) description. More specifically, the concept label discovery module 520 analyzes the metadata 117A of some of all of the videos 117, collecting a large set of n-grams (i.e., strings having at most n word tokens) occurring in the metadata of any of the videos. For example, for an embodiment in which the concept label discovery module 520 collects 4-grams, if the metadata for a particular video comprised a title having the text "Informative video about penguins," the concept discovery module would accordingly identify as potential concepts the strings "Informative video about penguins," "Informative video about", "video about penguins," "Informative video," "video about," "about penguins," "Informative," "video," "about," and "penguins." Concepts could be collected in a similar manner from the description, tags, or other user-supplied textual metadata. In one embodiment, in order to speed up subsequent processing the concept label discovery module 520 creates a lookup table mapping a concept to the videos that contain that concept within their metadata. The concept label discovery module 520 removes a set of predetermined stopwords unlikely to convey substantive meaning, such as articles and prepositions like "a," "the," and "of," from the list of potential concepts.

In an alternate embodiment, the concept label discovery module 520 obtains the set of potential concepts from another source, such as a pre-existing set of terms and phrases such as provided by WordNet, rather than extracting them from video metadata 117A.

In one embodiment, the concept label discovery module 520 purges identified potential concepts that occur too frequently or infrequently in the video metadata 117A, for some predetermined thresholds of frequency, such as a maximum threshold of 100,000 videos, and a minimum threshold of 1,500 videos. For example, the concepts "video" or "funny" are generic and so are likely to occur an extremely large number of times for very different genres of videos. Thus, they would be unlikely to represent a single, distinct type of video and would therefore be purged. Similarly, concepts that occur a very small number of times would not provide enough data to allow learning algorithms to train a useful classifier for the concepts and would likewise be purged.

The concept discovery module 235 additionally comprises a feature extraction module 530 that derives features used to compactly characterize a video for purposes of machine learning. In one embodiment, the feature extraction module 530 derives a number of different audiovisual features 505 from the content of the video 117, including features relating to motion rigidity, color and texture, and audio, storing them in association with the video. Specifically, homography transformation error between feature points on two consecutive frames is employed to estimate rigidity of motion. The rigidity of motion feature generates one real number per video corresponding to the fraction of frames in the video deemed to have only rigid motion. Regarding color and textual features, a custom local descriptor collects Gabor wavelet responses at different orientations, spatial scales, and spatial offsets form the interest point; the descriptors are extracted at sparse interest points determined by a Laplacian of Gaussian feature extractor. Bag-of-words histograms are computed, and codebooks are built using hierarchical k-means. The sparse feature histogram is extracted every half second. Once the entire video is processed, the cumulative histogram is converted into a sparse code by discarding bins with less than ten activations (corresponding to five seconds). In addition, an 8×8 Hue-Saturation histogram is computed for each frame. Each bin is then interpreted as a time series. An 8-level 1D Haar wavelet decomposition is employed, and the first two moments and the extremas are computed at each level. This descriptor is then appended to the feature to form the final feature vector, which is a sparse vector of real-valued data that implicitly characterizes object shape, color, and texture along with their temporal variations. Regarding the audio features, a cochlear model of filterbanks that form a Stabilized Auditory Image (SAI) is employed. To compute the SAI a set of band-pass filters is followed by an autocorrelation of each channel, which is then transformed into a sparse code using vector quantization. The end result is a sparse vector of real-valued data that implicitly characterizes several aspects of music and speech of the audio track. Visual features can include complex, high dimensional descriptors, such as SIFT (Scale Invariant Feature Transform), GLOH (Gradient Location and Orientation Histogram), LESH (Local Energy based Shape Histogram), or SURF (Speeded Up Robust Features) features. Audio features can include a vector forming a Stabilized Auditory Image (SAI). Specifically, a set of band-pass filters is employed, followed by autocorrelation of each channel, which is then transformed into a sparse vector using vector quantization.

In one embodiment, the same set of feature types—e.g., motion rigidity, color and texture, and audio—is extracted for every video. However, different ones of these types of features can be useful for learning different types of videos. For example, the audio features are effective for learning to recognize certain types of videos primarily characterized by their music but are of little use in distinguishing videos based on their visual motion, such as distinguishing cartoon videos from other types of videos. It is appreciated that the particular types of features employed may vary in different embodiments. That is, an embodiment can employ any type of feature that usefully describes properties of videos by which one video can be distinguished from another. The extracted features 505 then serve as a representation of the associated video 117 from which they were extracted for purposes of subsequent learning operations.

Partitioning module 535 partitions the videos 117 into different sets used for performing machine learning. More specifically, the partitioning module 535 divides the videos 117 into distinct training and validation sets globally applicable to all videos, where the training set is used for learning classifiers for different concepts and the validation set is used to test the accuracy of the learned classifiers. In one embodiment in which the discovery of concepts comprises some maximum number of learning iterations, the partitioning module 535 additionally subdivides the validation set into a number of sub-partitions, one for each possible iteration.

Further, the partitioning module 535 defines, for every concept 220, a training set and validation set specifically for that concept, the members of the per-concept training set and validation set being randomly selected subsets of the global training set and validation set, respectively. The partitioning module 535 also divides the videos of the per-concept training and validation sets into "positive" examples presumed to be representative of the associated concept and "negative" examples presumed not to be representative. In one embodiment, the partitioning module 535 identifies a video as belonging to the positive set if the label 221A of the associated concept is located somewhere within its textual metadata—e.g., with each of its words in the same sequential order after the removal of stopwords and whitespace—and to the negative set otherwise. Thus, in this embodiment the positive and negative sets are defined with reference only to the user-defined metadata, without the need for manual labeling by human experts. In one embodiment, the number of negative examples that are identified is three times as many as the positive examples, with negative examples beyond that number being omitted. In short, for each concept there are four sets of videos: a training set and a validation set, each of these sets including one positive example set (textual metadata matching the concept label) and one negative example set (no textual data matching the concept label).

The concept discovery module 235 additionally comprises a classifier training module 540 that iteratively learns classifiers 221B for the concepts 220 based on the positive and negative examples identified for a concept by the partitioning module 535. More specifically, at a given iteration the classifier training module 540 attempts to learn the classifier 221B for each concept 220 by applying an ensemble learning algorithm to the derived features 205 of the videos 117 in the training set for the concept. In one embodiment, the ensemble learning algorithm employed is AdaBoost, with a number of stumps linearly proportional to the number of videos in the positive training set. Other learning algorithms, such as Linear Support Vector Machine (SVC), the details of which are known to those of skill in the art of machine learning, could likewise be used.

The classifier training module 540 evaluates the accuracy of each trained classifier 221B by applying the classifier to the videos of the validation set defined for the concept associated with the classifier, and by determining whether the resulting classification is accurate. Specifically, the classifier 221B for a concept is applied to each video in the validation set for the concept, producing some score indicating whether the video matches the associated concept.

If the score produced by the classifier is not already Boolean—directly indicating whether or not the video matches the concept—it may be mapped to a Boolean value. For example, in embodiments in which the classifiers 221B produce real number scores indicating a degree of match strength, the real numbers can be compared to some predetermined threshold, such as 0.94 on a scale of 0.0 to 1.0, to determine whether the similarity is sufficiently strong to constitute a match, with numbers greater than the threshold indicating a match, and lesser numbers indicating a failure to match. If the classifier produces a score indicating that a positive example of the training set represents the concept, the classification is considered a true positive classification (TP). Similarly, a score indicating that a video from the negative examples represents the concept is considered a false positive (FP), a score indicating that a video from the positive examples does not represent the concept is considered a false negative (FN), and a score indicating that a video from the negative examples does not represent the concept is considered a true negative (TN).

The classifier training module 540 retains a trained classifier for a given concept—that is, considers its associated concept to be recognizable—only if the scores produced by the classifier indicate sufficient accuracy. In one embodiment, the accuracy is considered sufficient only if the precision and recall of the classifier are both above predetermined values, such as 0.7, where the precision P is defined as $P=TP/(TP+FP)$, and the recall R is defined as $R=TP/(TP+FN)$. In another embodiment, the accuracy is considered sufficient only if an F-score is above some predetermined threshold (e.g., 0.7), where the F-score F is defined as a function of the precision and recall, $F=2PR/(P+R)$.

As a simple example, assume that the concept label discovery module 520 had identified a concept C and trained a corresponding classifier c. Then for given videos $V_1$ to $V_5$ in the validation set for C, the classifier training module 540 might produce a set of corresponding scores 0.8, 0.1, 0.35, 0.6, and 0.9. Assuming that $V_1$, $V_4$, and $V_5$ were in the positive subset of the validation set, and $V_2$ and $V_3$ were in the negative subset, and that 0.8 is the minimum score to indicate a match, the classifier training module 540 might calculate results as follows:

| Video | Score | Set | Mapped | Type |
|---|---|---|---|---|
| $V_1$ | 0.8 | Pos | 1 | TP |
| $V_2$ | 0.1 | Neg | 0 | TN |
| $V_3$ | 0.35 | Neg | 0 | TN |
| $V_4$ | 0.6 | Pos | 0 | FP |
| $V_5$ | 0.9 | Pos | 1 | TP |

That is, the score 0.8 for video $V_1$, since it is at least as large as the threshold for a match, would be mapped to 1 (indicating a match), and would represent a true positive (TP) since it came from the positive validation subset for concept C. Similarly, the score of 0.35 for video $V_3$ is less than the threshold and would thus be mapped to 0 (indicating no match), and would represent a true negative (TN) since it came from the negative validation subset for C.

The concept discovery module 235 also comprises a feature update module 545 that updates the features associated with a video 117 based on the trained classifiers 221B. Specifically, if at a given iteration the classifier training module 540 has trained classifiers for some set of concepts for which classifiers had not previously been trained (and has retained them as being sufficiently accurate), then each of these newly-trained classifiers is applied to each video 117 in the video repository. This produces a set of scores for each video, one for each newly-learned classifier. The feature update module 545 then adds these scores as new features to the existing features 505 for a video. For example, in one embodiment the feature update module 545 appends the scores to a feature vector for a video, thereby increasing the number of dimensions of the feature vector. For consistency, the order of the scores as appended to the videos 117 is consistent across the videos. Thus, the feature update module 545 effectively adds new feature information to the feature information 505 already associated with a video 117, and this information can be used to enhance classifier learning at the next iteration. Similarly, in embodiments in which an existing (retained) classifier is re-learned at a subsequent iteration, the scores associated with that re-learned classifier are substituted for the corresponding scores obtained from the existing version of the classifier and added to the features 505.

The flow of data and processing operations of the above-described modules of the concept discovery module 235 are now described.

Figure 6:
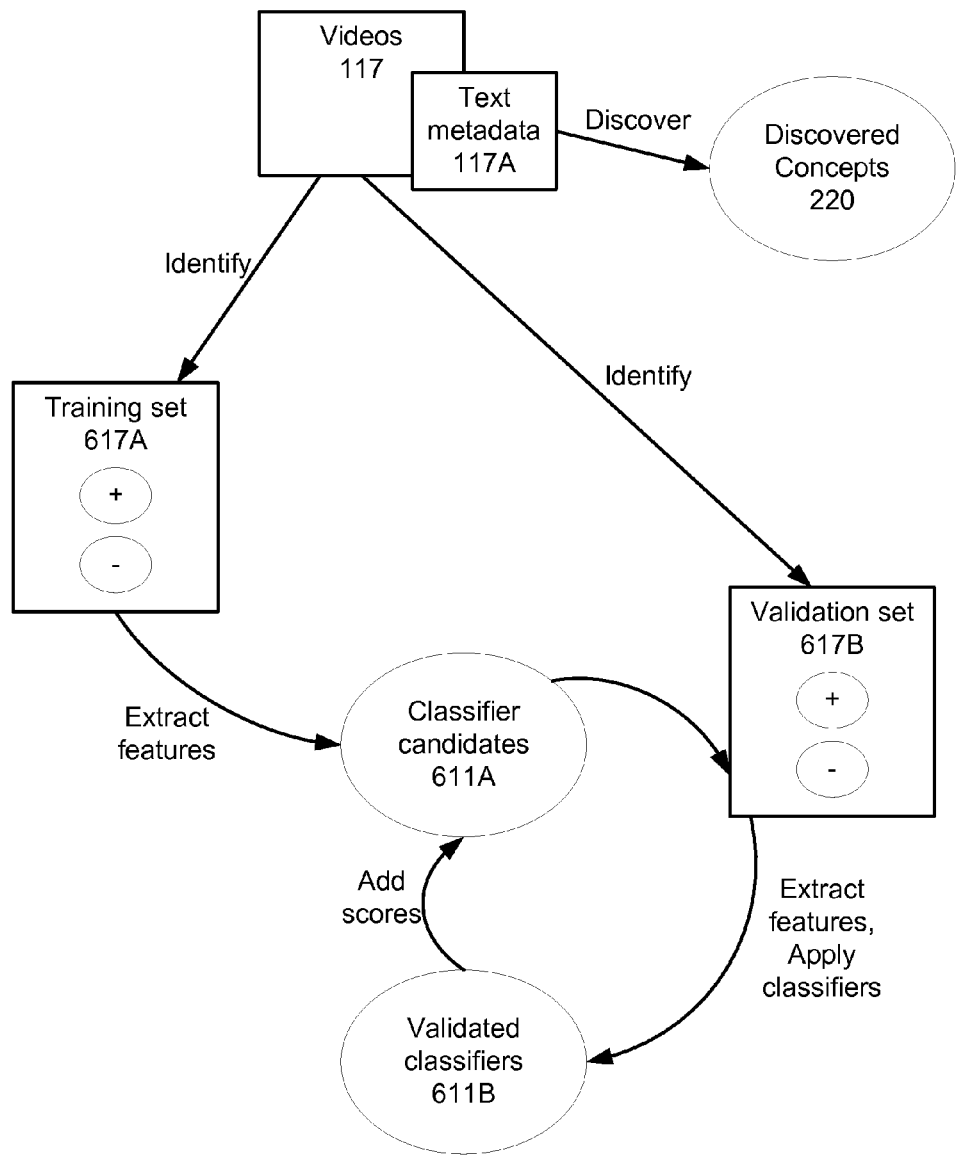
FIG. 6 is a data flow diagram representing the interactions of the various types of data analyzed and/or produced by the concept discovery module 235, according to one embodiment.

FIG. 6 is a data flow diagram representing the interactions of the various types of data analyzed and/or produced by the concept discovery module 235, according to one embodiment.

Given the videos 117 and their associated textual metadata 117A, the concept label discovery module 520 discovers the set of concepts 220 by extracting n-grams (concepts) from the metadata. Further, the partitioning module 535 identifies, for each of the discovered concepts 220, a training set 617A and a validation set 617B that are subsets of the videos 117, as well as establishing a positive and a negative set of examples from within each.

The feature extraction module 530 extracts features from the training set 617A, and at each iteration the classifier training module 540 uses these features to train a classifier candidate 611A for each of the discovered concepts 220. Similarly, the feature extraction module 530 extracts features from the validation set 617B, and at each iteration the classifier training module 540 applies the classifier candidates 611A to these features to obtain a set of scores. The classifier training module 540 uses these scores to identify a set of validated classifiers 611B that are sufficiently accurate in recognizing whether or not videos represent the concepts associated with the classifiers. The feature update module 545 then adds the scores generated by the newly validated classifiers 611B to the features already associated with the videos in the training set 617A and the validation set 617B. Using these new scores, in addition to the features extracted from the training set 617A and any scores from prior iterations, the classifier training module 540 trains new classifier candidates 611A in the next iteration.

Note that constraints on the learning process permit accurate learning of classifiers based only on the scarce or potentially-inaccurate user-supplied metadata. Specifically, the purging of concepts that are too frequent or too infrequent, the evaluation of the trained classifiers on a previously unseen validation set after every iteration, and a requirement of high classifier accuracy (e.g., both high precision and high recall) work together to ensure that the inaccuracies of the user-supplied metadata are properly taken into account.

Thus, by above-described process performed by the concept discovery module 235 learns concepts that can be accurately recognized in a set of videos, as well as the classifiers used to recognize them. Moreover, the process operates without the need for any set of concepts to be known a priori, and without the need for human experts to pre-apply or verify concept labels to the various videos.

Although the above description has focused on the categorization of videos, it is appreciated that the above-described principles can also be applied to other types of media objects, such as image files, sound files, multimedia files, textual documents, or other types of digital objects with which metadata is associated and from the content of which descriptive characteristics can be extracted.

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely for purposes of example, and is not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer-implemented method for determining category classifiers applicable to videos of a digital video repository, the method comprising:
    accessing a category-instance repository comprising relationships between categories and instances of categories, the category-instance repository derived from a corpus of documents comprising textual portions, the derivation comprising computing strengths for relationships between categories and instances based at least in part on frequencies of co-occurrence of the categories and instances over the corpus of documents;
    accessing a set of video concept classifiers derived from the videos and associated with concepts derived from textual metadata of the videos of the digital video repository;
    computing consistency scores for a plurality of the categories based at least in part on scores obtained from video concept classifiers associated with concepts corresponding to the instances of the plurality of categories;
    selectively removing categories of the category-instance repository based at least in part on whether the computed consistency scores indicate a threshold level of inconsistency; and
    determining, for each category of a plurality of the categories not removed, a category classifier based at least in part on the video concept classifiers of concepts associated with the category, the determined category classifier when applied to a video producing a score indicating whether the video represents the category for which the category classifier was determined.

2. The computer-implemented method of claim 1, further comprising removing instances of categories, responsive to the instances not corresponding to any of the concepts.

3. The computer-implemented method of claim 1, wherein the consistency scores are median average deviation (MAD) scores computed from the scores obtained from the video concept classifiers.

4. The computer-implemented method of claim 1, wherein the selectively removing the categories comprises:
    computing, for each of a plurality of the instances, a set of top categories for the instance; and
    removing a category responsive at least in part to there being fewer than some minimum threshold number of instances for which the category is in the instance's set of top categories or there being more than some maximum threshold number of instances for which the category is in the instance's set of top categories.

5. The computer-implemented method of claim 1, wherein the accessing the category-instance repository comprises:
    storing a set of textual patterns indicating a category-instance relationship between a portion of text corresponding to a category and a portion of text corresponding to an instance;
    applying the textual patterns over the corpus of documents, thereby identifying a set of category-instance relationships;
    and
    retaining, as the categories and instances of the category-instance repository, the categories and instances having relationships with computed strengths of at least some predetermined threshold value.

6. The computer-implemented method of claim 5, wherein computing a strength for a category-instance relationship comprises:
    computing a number of distinct patterns for which there was a relationship of the category and the instance over the corpus of documents.

7. The computer-implemented method of claim 1, further comprising:
    applying one of the determined category classifiers to one of the videos, thereby obtaining a score; and
    responsive to the obtained score indicating that the video represents the category, adding a textual representation of the category to the textual metadata of the one of the videos.

8. The computer-implemented method of claim 1, wherein the accessing the set of video concept classifiers comprises:
    storing a set of concepts derived from textual metadata of the videos;
    initializing a set of candidate classifiers, each candidate classifier associated with one of the concepts corresponding to the video concept classifiers;
    extracting features from the videos, including a set of training features from a training set of the videos and a set of validation features from a validation set of the videos;
    iteratively learning accurate classifiers by iteratively performing the steps of:
        training the candidate classifiers based at least in part on the set of training features;
        determining which of the trained candidate classifiers accurately classify videos, based at least in part on application of the trained candidate classifiers to the set of validation features;
        applying the candidate classifiers determined to be accurate to ones of the features, thereby obtaining a set of scores, and
        adding the set of scores to the set of training features; and
    storing, as the video concept classifiers, the candidate classifiers determined to be accurate.

9. A non-transitory computer-readable storage medium having executable computer program instructions embodied therein for determining category classifiers applicable to digital media items of a digital media repository, actions of the computer program instructions comprising:
    accessing a category-instance repository comprising relationships between categories and instances of categories, the category-instance repository derived from a corpus of documents comprising textual portions, the derivation comprising computing strengths for relationships between categories and instances based at least in part on frequencies of co-occurrence of the categories and instances over the corpus of documents;

accessing a set of media item concept classifiers derived from the media items and associated with concepts derived from textual metadata of the digital media items in the digital media repository;

computing consistency scores for a plurality of the categories based at least in part on scores obtained from media item concept classifiers associated with concepts corresponding to the instances of the plurality of categories;

selectively removing the categories of the category-instance repository based at least in part whether the computed consistency scores indicate a threshold level of inconsistency; and determining, for each category of a plurality of the categories not removed, a category classifier based at least in part on the media item concept classifiers of concepts associated with the category, the determined category classifier when applied to a media item producing a score indicating whether the media item represents the category for which the category classifier was determined.

10. The non-transitory computer-readable storage medium of claim 9, wherein the consistency scores are median average deviation (MAD) scores computed from the concept scores.

11. The non-transitory computer-readable storage medium of claim 9, wherein the selectively removing the categories comprises:

computing, for each of a plurality of the instances, a set of top categories for the instance; and removing a category responsive at least in part to there being fewer than some minimum threshold number of instances for which the category is in the instance's set of top categories or there being more than some maximum threshold number of instances for which the category is in the instance's set of top categories.

12. The non-transitory computer-readable storage medium of claim 9, wherein the accessing the category-instance repository comprises:

storing a set of textual patterns indicating a category-instance relationship between a portion of text corresponding to a category and a portion of text corresponding to an instance;

applying the textual patterns over the corpus of documents, thereby identifying a set of category-instance relationships; and retaining, as the categories and instances of the category-instance repository, the categories and instances having relationships with computed strengths of at least some predetermined threshold value.

13. The non-transitory computer-readable storage medium of claim 12, wherein computing a strength for a category-instance relationship comprises:

computing a number of distinct patterns for which there was a relationship of the category and the instance over the corpus of documents.

14. The non-transitory computer-readable storage medium of claim 9, the actions of the computer program instructions further comprising:

applying one of the determined category classifiers to one of the media items, thereby obtaining a score; and responsive to the obtained score indicating that the media item represents the category, adding a textual representation of the category to the textual metadata of the one of the media items.

15. The non-transitory computer-readable storage medium of claim 9, wherein the accessing the set of media item concept classifiers comprises:

storing a set of concepts derived from textual metadata of the media items;

initializing a set of candidate classifiers, each candidate classifier associated with one of the concepts corresponding to the media item concept classifiers;

extracting features from the media items, including a set of training features from a training set of the media items and a set of validation features from a validation set of the media items;

iteratively learning accurate classifiers by iteratively performing the steps of:

training the candidate classifiers based at least in part on the set of training features;

determining which of the trained candidate classifiers accurately classify media items, based at least in part on application of the trained candidate classifiers to the set of validation features;

applying the candidate classifiers determined to be accurate to ones of the features, thereby obtaining a set of scores, and adding the set of scores to the set of training features; and storing, as the media item concept classifiers, the candidate classifiers determined to be accurate.

16. A computer system for determining category classifiers applicable to videos of a digital video repository, the system comprising:

a computer processor; and a computer program executable by the computer processor and performing actions comprising:

creating a category-instance repository comprising relationships between categories and instances of categories, the creating comprising:

applying textual patterns over a corpus of documents comprising textual portions, and computing strengths for category-instance relationships based at least in part on frequencies of co-occurrence of the categories and instances;

training a set of video concept classifiers on the videos and on textual metadata associated with the videos, each of a plurality of the classifiers corresponding to a concept derived from the textual metadata;

removing instances of categories, responsive to the instances not corresponding to any of the concepts;

filtering the categories of the category-instance repository based on the concepts associated with the video concept classifiers to remove categories that are not likely to be accurately recognized in videos;

removing inconsistent categories by:

identifying, as video concept classifiers associated with a category, video concept classifiers of concepts with labels corresponding to labels of the instances of the category;

applying the video concept classifiers associated with the category to a video, thereby obtaining concept scores;

computing a consistency score for the category based at least in part on the concept scores; and removing the category responsive to the computed consistency score indicating some threshold level of inconsistency; and determining, for each of a plurality of the categories, a category classifier based at least in part on the video concept classifiers of concepts associated with the category.

17. The system of claim 16, the actions further comprising:
applying one of the determined category classifiers to one of the videos, thereby obtaining a score; and
responsive to the obtained score indicating that the video represents the category, adding a textual representation of the category to the textual metadata of the video.

18. A computer-implemented method comprising:
accessing a category-instance repository comprising relationships between categories and instances of categories, the category-instance repository derived from a corpus of documents comprising textual portions, the derivation comprising computing strengths for relationships between categories and instances based at least in part on frequencies of co-occurrence of the categories and instances over the corpus of documents;
accessing a set of media item concept classifiers derived from media items and associated with concepts derived from textual metadata of the media items;
computing consistency scores for a plurality of the categories based at least in part on scores obtained from media item concept classifiers associated with concepts corresponding to the instances of the plurality of categories;
selectively removing the categories of the category-instance repository based at least in part whether the computed consistency scores indicate a threshold level of inconsistency; and
determining, for each category of a plurality of the categories not removed, a category classifier based at least in part on the media item concept classifiers associated with concepts that are associated with the category, the determined category classifier when applied to a media item producing a score indicating whether the media item represents the category for which the category classifier was determined.

19. The computer-implemented method of claim 18, further comprising identifying the concepts that are associated with a category by identifying concepts that correspond to the instances of the category.

* * * * *